(12) United States Patent
Ji

(10) Patent No.: US 12,169,104 B2
(45) Date of Patent: Dec. 17, 2024

(54) HEAT EXCHANGER STAINLESS STEEL VACUUM CASTING BRAZING FILLER METAL WELDING PLANECONNECTOR AND MACHINING AND WELDING METHOD

(71) Applicant: Shangzhong Ji, Shanghai (CN)

(72) Inventor: Shangzhong Ji, Shanghai (CN)

( * ) Notice: Subject to any disclaimer, the term of this patent is extended or adjusted under 35 U.S.C. 154(b) by 162 days.

(21) Appl. No.: 17/870,030

(22) Filed: Jul. 21, 2022

(65) Prior Publication Data

US 2022/0397350 A1 Dec. 15, 2022

Related U.S. Application Data

(63) Continuation of application No. PCT/CN2020/134186, filed on Dec. 7, 2020.

(51) Int. Cl.
| | | |
|---|---|---|
| *B23K 1/00* | (2006.01) | |
| *B23K 1/008* | (2006.01) | |
| *F28F 9/02* | (2006.01) | |
| *B23K 101/14* | (2006.01) | |
| *B23K 103/04* | (2006.01) | |

(52) U.S. Cl.
CPC .......... *F28F 9/0248* (2013.01); *B23K 1/0012* (2013.01); *B23K 1/008* (2013.01); *B23K 2101/14* (2018.08); *B23K 2103/05* (2018.08); *F28F 2275/045* (2013.01)

(58) Field of Classification Search
CPC .. B23K 1/0012; B23K 2101/14; B23K 1/008; B23K 2103/05; F28F 21/083; F28F 2275/04; F28F 2225/00; F28F 2275/02
See application file for complete search history.

(56) References Cited

U.S. PATENT DOCUMENTS

| | | | |
|---|---|---|---|
| 2010/0006275 A1* | 1/2010 | Arvidsson | F28D 9/005 |
| | | | 165/170 |
| 2011/0220337 A1* | 9/2011 | Munari | B23K 1/0012 |
| | | | 165/181 |
| 2011/0290461 A1* | 12/2011 | Andersson | F28D 9/005 |
| | | | 165/170 |

(Continued)

FOREIGN PATENT DOCUMENTS

| | | |
|---|---|---|
| CN | H04300070 A | 10/1992 |
| CN | 102179587 A | 9/2011 |

(Continued)

OTHER PUBLICATIONS

International search report of PCT/CN2020/134186.

*Primary Examiner* — Erin B Saad

(57) ABSTRACT

A stainless-steel heat-exchanger port with a braze joint interface formed from a brazing filler material by vacuum melting and molding, including: a stainless-steel port, an annular groove provided at a to-be-brazed end face of the stainless-steel port, a brazing filler material correspondingly arranged in the annular groove, and a sealing cover for preventing overflowing of the brazing filler material when melted, wherein the brazing filler material is one of copper, brass, phosphorus copper, and silver brazing filler materials. A processing method for the stainless-steel heat-exchanger port with a braze joint interface formed from the brazing filler material by vacuum melting and molding.

1 Claim, 10 Drawing Sheets

(56) References Cited

U.S. PATENT DOCUMENTS

| | | | | |
|---|---|---|---|---|
| 2015/0052893 A1* | 2/2015 | Geskes | ................ | F28D 9/0056 |
| | | | | 165/166 |
| 2018/0023737 A1* | 1/2018 | Joly | ..................... | F16L 23/032 |
| | | | | 285/136.1 |
| 2022/0397350 A1* | 12/2022 | Ji | ............................ | B23K 1/19 |
| 2023/0256530 A1* | 8/2023 | Bornegård | ........... | B23K 1/0012 |
| | | | | 228/183 |

FOREIGN PATENT DOCUMENTS

| | | |
|---|---|---|
| CN | 202934254 U | 5/2013 |
| CN | 103203608 A | 7/2013 |
| CN | 104019288 A | 9/2014 |
| CN | 105171172 A | 12/2015 |
| CN | 109604769 A | 4/2019 |
| CN | 109954996 A | 7/2019 |
| CN | 110977077 A | 4/2020 |
| CN | 211708316 U | 10/2020 |

* cited by examiner

HEAT EXCHANGER STAINLESS STEEL VACUUM CASTING BRAZING FILLER METAL WELDING PLANECONNECTOR AND MACHINING AND WELDING METHOD

TECHNICAL FIELD

The invention belongs to the technical field of heat exchangers, and in particular relates to a stainless-steel heat-exchanger port with a braze joint interface formed from a brazing filler material by vacuum melting and molding and a processing method therefor.

BACKGROUND

A brazed plate heat exchanger is mainly used in a refrigeration system and used as an evaporator and a condenser. When the brazed plate heat exchanger is to be connected to the refrigeration system, red copper pipes are used and the connection is done by brazing, and currently, gas brazing is adopted always. Inlet/outlet ports of the brazed plate heat exchanger are both made of stainless steel. In a brazing process, the stainless steel is highly prone to oxidization at a high temperature and is very difficult to be joined to the brazing filler material, which may cause a weak braze joint and blisters and thus lead to leakage of the system. A flux has to be used during brazing of copper and stainless steel, which will also pollute the air and cause health damage to a welder. In addition, stringent requirements are imposed on welding rods in that silver welding rods with a silver content above 30% are required, leading to a high brazing cost. Moreover, exceptional skill of the welder in brazing is also required, as a heating temperature for two different metals must be well controlled. If the temperature goes too high, the surface of the stainless-steel port will be oxidized. If the temperature is low, adhesion force of the brazing rod will be reduced, which will cause a weak braze joint and bring certain difficulties and inconvenience to users when using the brazed plate heat exchanger.

SUMMARY

In view of the above-mentioned deficiencies of the prior art, an object of the present invention is to provide a stainless-steel heat-exchanger port with a braze joint interface formed from a brazing filler material by vacuum melting and molding and a processing method therefor. In the port with the braze joint interface, an annular groove is provided at an end face of a stainless-steel port, and any one of copper, brass, phosphorus copper, and silver brazing, filler materials is melted and molded in the annular groove, so as to form a brazing filler material end face on the end thee of the stainless-steel port and facilitate brazing with a copper pipe.

The object of the present invention is achieved by the following technical scheme:

A stainless-steel heat-exchanger port with a braze joint interface formed from a brazing filler material by vacuum melting and molding is provided herein, including: a stainless-steel port, an annular groove provided at a to-be-brazed end face of the stainless-steel port, a brazing filler material correspondingly arranged in the annular groove, and a sealing cover for preventing overflowing of the brazing filler material when melted, wherein the brazing filler material is one of copper, brass, phosphorus copper, and silver brazing filler materials.

The annular groove is intended to increase a contact area between the brazing filler material and stainless steel, and a shape of a cross section of the annular groove may be one of a rectangular shape, a V-shape, a semicircular shape, and an oval shape.

The annular groove has a depth ranging from 1 mm to 5 mm.

Two sides of the annular groove are each formed in a tapered shape for sealing, which forms taper sealing with the sealing cover.

The sealing cover is shaped to conform to the tapered shape of each of the two sides of the annular groove for sealing, so that the brazing filler material is kept in a sealed slate in a vacuum furnace, thus preventing the brazing filler material overflowing from the annular groove when melted.

The brazing filler material and the stainless-steel port are joined to each other by vacuum melting and molding.

A processing method for the stainless-steel heat-exchanger port with a braze joint interface formed from a brazing filler material by vacuum melting and molding is also provided herein, including: providing an annular groove at a to-be-brazed end face of an stainless-steel port, and placing a brazing filler material in the annular groove; and placing a sealing cover over the brazing filler material and then heating the stainless-steel port together with the heat exchanger in a vacuum furnace to a temperature above a melting point of the brazing filler material, so that the brazing filler material melts and fills a molding space between the annular groove and the sealing cover and is joined to the stainless-steel port heated to a high temperature, while the sealing cover is made of a special material which will not be joined to the brazing filler material, and thus the to-be-brazed end face of the stainless-steel port is finally covered with the brazing filler material.

The advantages of the present invention are that brazing between the heat exchanger port and a copper pipe becomes simple and easy, and firmness of the joint is effectively improved; a brazing time can be shortened so that production efficiency can be improved; material costs can be greatly reduced; and no flux is used during processing, thus causing no air pollution.

DETAILED DESCRIPTION

Figure 1:
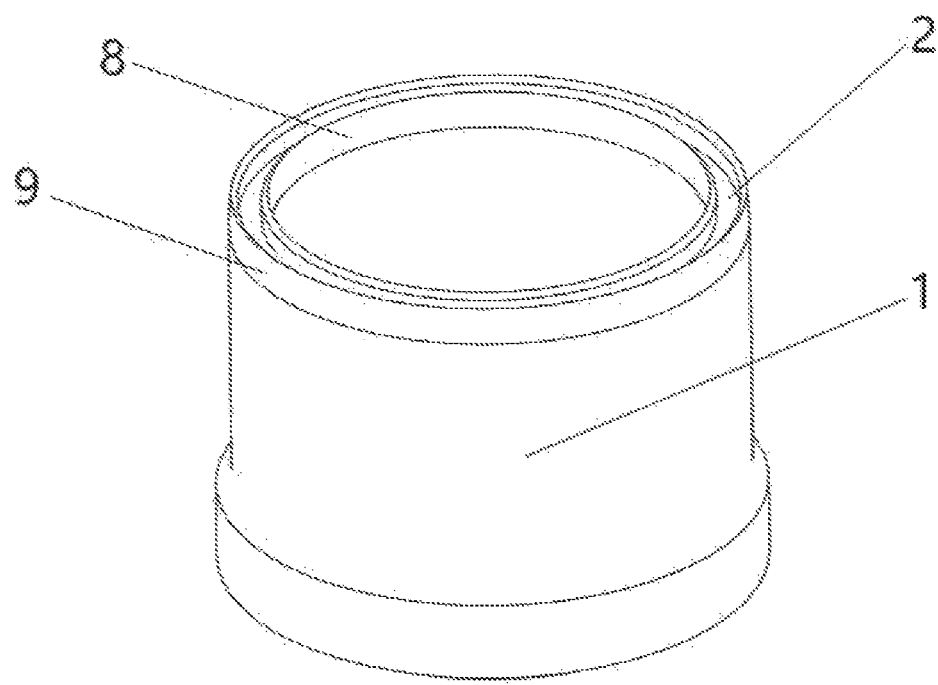
FIG. 1 is a three-dimensional view of a stainless-steel port, an annular groove and tapered sealing surfaces according to the present invention.

Features of the present invention and other related features are described in further detail below with an embodiment in conjunction with the accompanying drawings to facilitate understanding of the present invention by those skilled in the art:

As shown in FIGS. 1-10, reference numerals 1-11 in the figures denote the following elements, respectively: stainless-steel port 1, annular groove 2, sealing cover 3, brazed plate heat exchanger 4, brazing filler material for melting and molding 5, copper pipe 6, brazing filler material 7, inner and outer tapered sealing surfaces 8 and 9 on the stainless-steel port, and inner and outer tapered sealing surfaces 10 and 11 on the sealing cover.

Embodiment: As shown in FIGS. 1-8, this embodiment specifically relates to a stainless-steel heat-exchanger port with a braze joint interface formed from a brazing filler material by vacuum melting and molding and a processing method therefor. The port with the braze joint interface includes a stainless-steel port 1, an annular groove 2 provided on the stainless-steel port 1, a sealing cover 3, and a brazing filler material for melting and molding 5 correspondingly provided in the annular groove 2.

As shown in FIGS. 1-8, the stainless-steel port 1 in this embodiment is specifically provided on a brazed plate heat exchanger 4 and used as an inlet/outlet port. The annular groove 2 is arranged at a to-be-brazed end face of the stainless-steel port 1, and a depth of the annular groove 2 ranges from 2 mm to 5 mm. The annular groove is provided to increase a contact area between the stainless-steel port and the brazing filler material, so that a braze joint strength is enhanced. A shape of a cross section of the annular groove 2 may be one of a rectangular shape, a V-shape, a semicircular shape, and an oval shape. In this embodiment, specifically, a rectangular cross section is used. Two sides of the annular groove 2 of the stainless-steel port 1 each have a tapered shape for sealing, which conforms to a tapered shape of the sealing cover 3. Once the sealing cover 3 is placed over the annular groove 2, the brazing filler material 5 is in an enclosed state.

As shown in FIGS. 1-8, the brazing filler material for melting and molding 5 is correspondingly disposed in the annular groove 2, and the molten brazing filler material 5 fills a molding space between the annular groove 2 and the sealing cover 3, so that the to-be-brazed end face of the stainless-steel port 1, which is originally made of stainless steel, is changed to the melted and molded brazing filler material 5. The brazing filler material for melting and molding 5 in this embodiment may be made of one or more of copper, brass, phosphorus copper, and silver filler materials, which makes brazing with a copper pipe 6 to be joined subsequently very easy.

As shown in FIGS. 1-8, the processing method for the stainless-steel heat exchanger port with a braze joint interface formed from a brazing filler material by vacuum melting and molding in this embodiment specifically includes the following steps.

Figure 2:
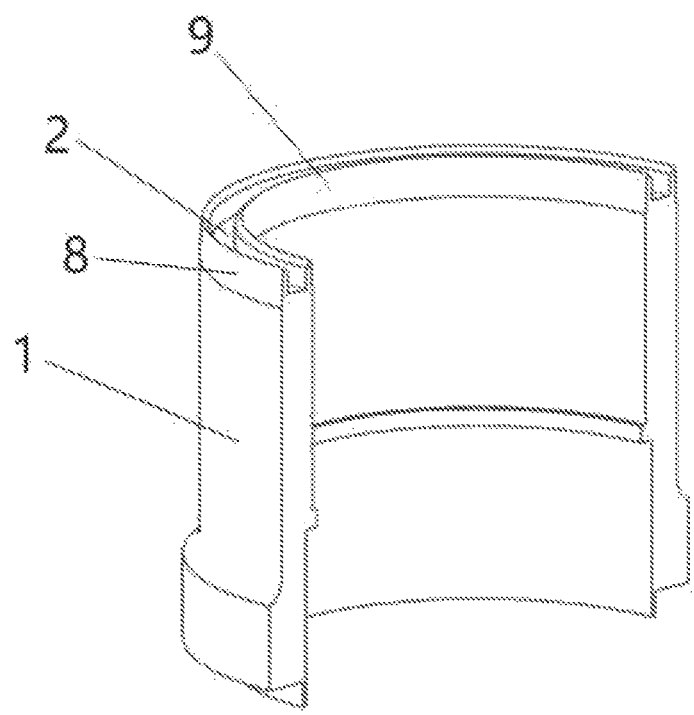
FIG. 2 is a sectional view of FIG. 1 according to the present invention.
Figure 3:
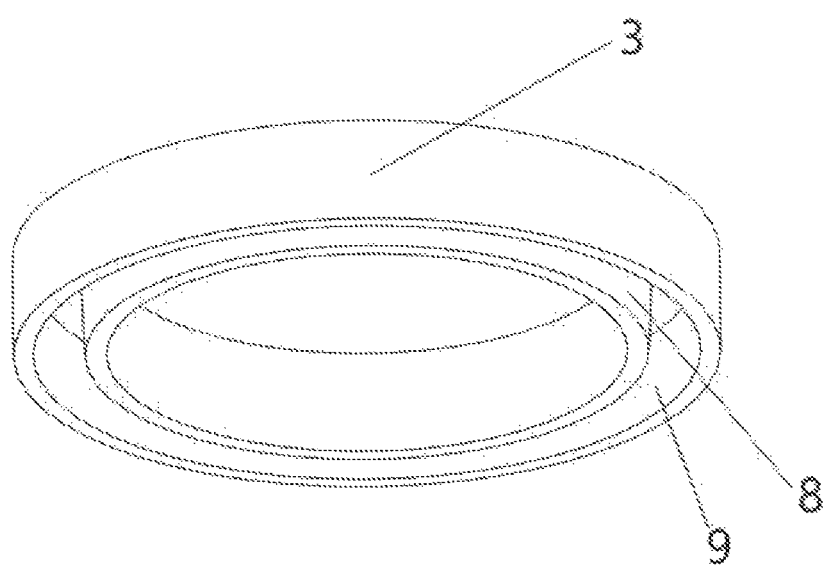
FIG. 3 is a three-dimensional view of a sealing cover and tapered sealing surfaces according to the present invention.
Figure 4:
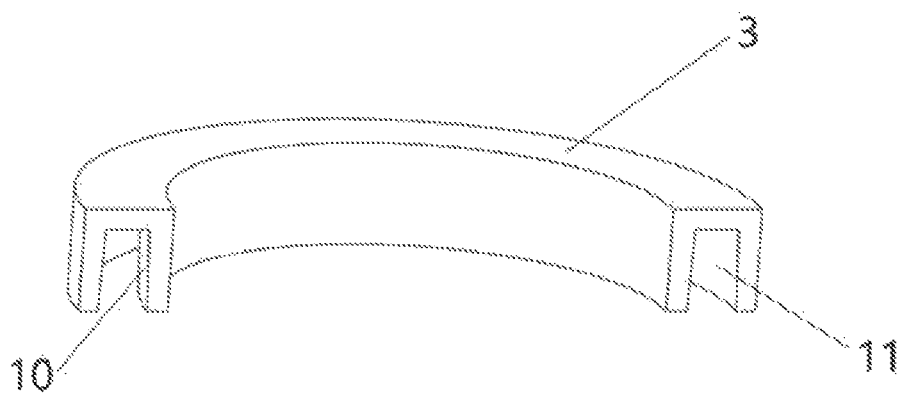
FIG. 4 is a sectional view of FIG. 3 according to the present invention.
Figure 5:
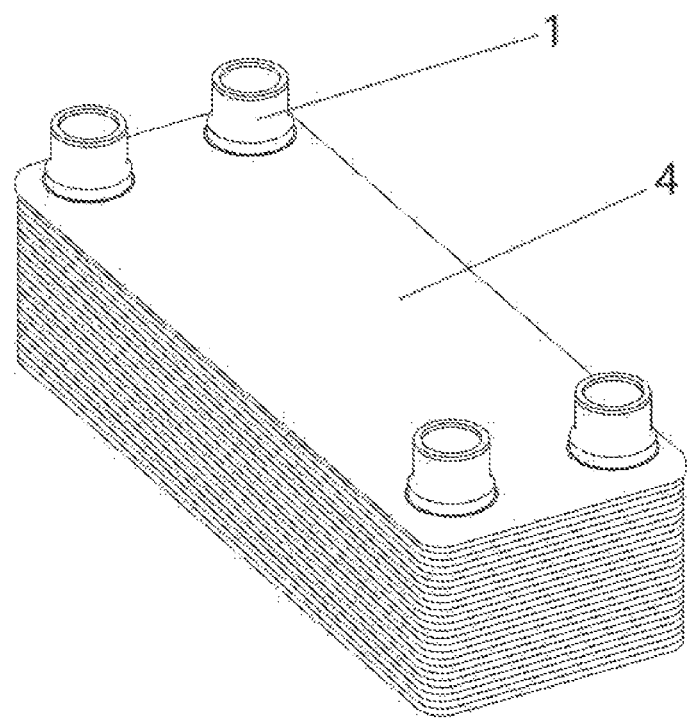
FIG. 5 is a schematic view of the stainless-steel port on a brazed plate heat exchanger according to the present invention.

(1) As shown in FIGS. 1 and 2, the stainless-steel port 1 is provided with the annular groove 2, and for example, a groove with a rectangular cross section as shown in FIG. 1 is used in this embodiment.

Figure 6:
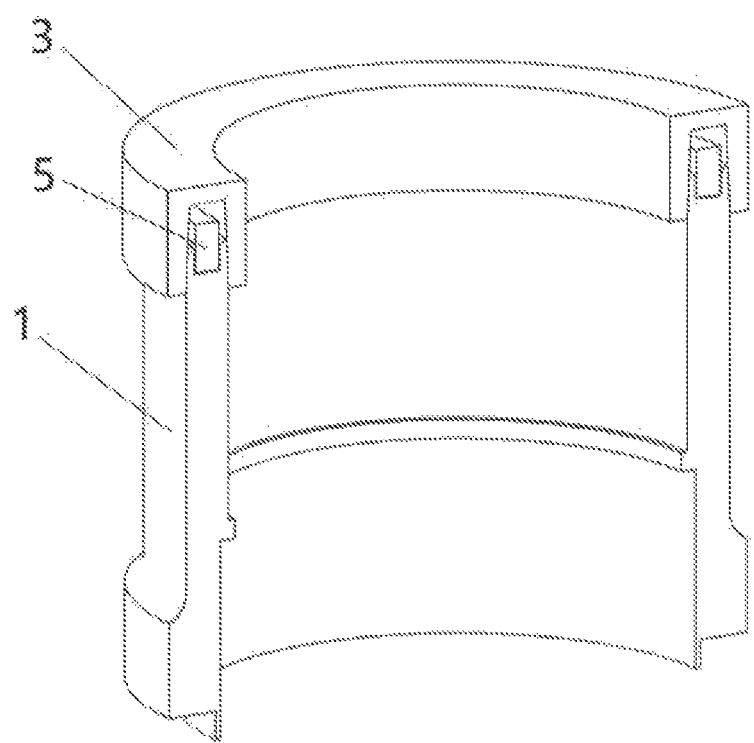
FIG. 6 is a sectional view of an assembly of the stainless-steel port, a brazing filler material, and the sealing cover, which is going to be fed into a vacuum furnace, according to the present invention.

(2) As shown in FIG. 6, it can be seen from the sectional view that assembly is done before introduction into a vacuum furnace, that is, the brazing filler material 5 is placed in the annular groove 2 of the stainless-steel port 1, and then the sealing cover 3 is placed over the annular groove 2, so that the brazing filler material 5 is placed in an enclosed molding space; and finally, the brazed plate heat exchanger 4 is put into the vacuum furnace together with the stainless-steel port 1, the sealing cover 3 and the brazing filler material 5 thereon for vacuum processing.

Figure 7:
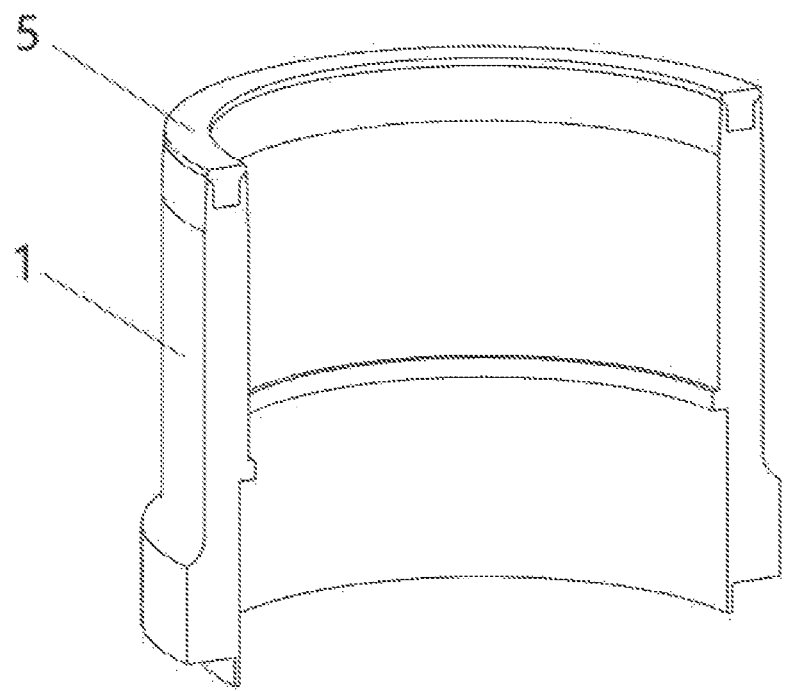
FIG. 7 is a sectional view of the stainless-steel port after being processed in the vacuum furnace according to the present invention.
Figure 8:
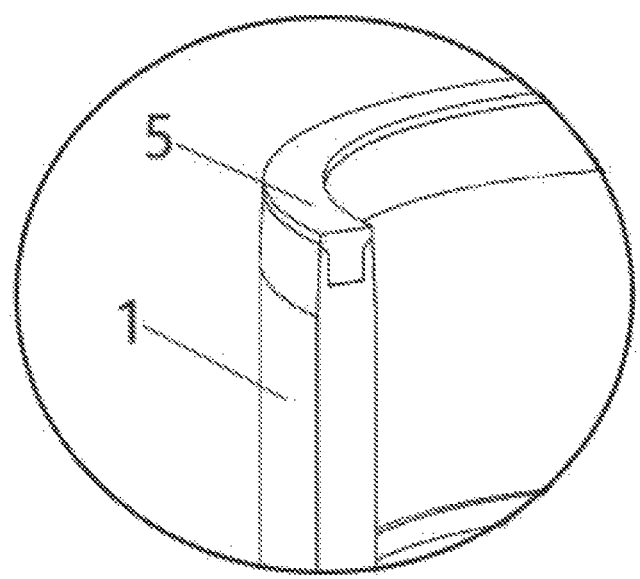
FIG. 8 is a partial enlarged view B FIG. 6 according to the present invention.

(3) As shown in FIG. 7, the brazing filler material 5 is heated in the vacuum furnace to a temperature above a melting point of the brazing filler material 5, so that the brazing filler material melts and fills a molding space in the annular groove, thus completing the whole processing of the stainless-steel port 1. As the entire melting and molding process is carried out in the vacuum furnace, there is no oxidation problem, which greatly improves braze joint strength, and in this way, a flat braze joint, interlace made of a brazing material or copper is formed on the to-be-brazed end face of the stainless-steel port 1.

Figure 9:
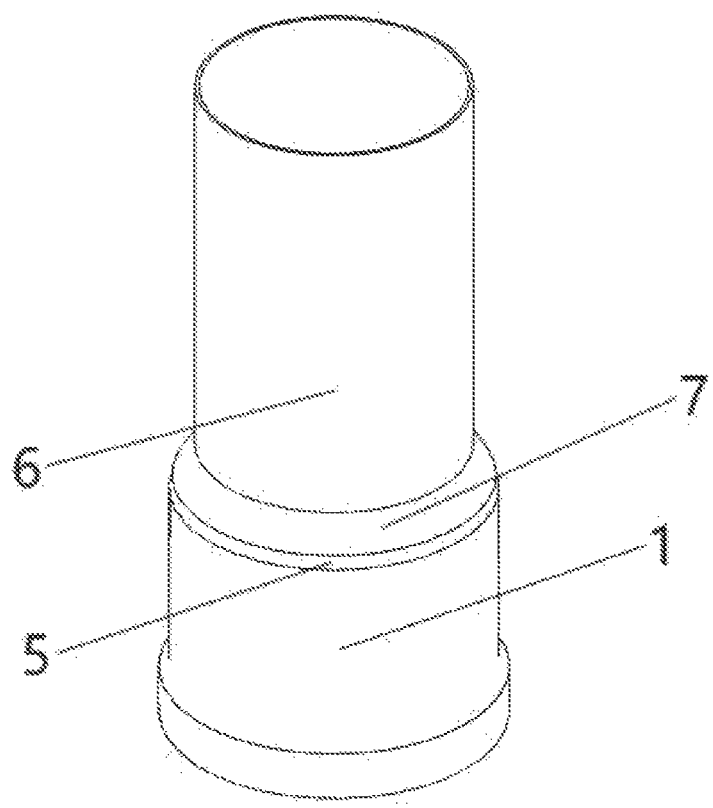
FIG. 9 is a schematic view of the stainless-steel port with a braze joint interface formed from the brazing filler material by vacuum melting and molding after being brazed to a copper pipe according to the present invention.
Figure 10:
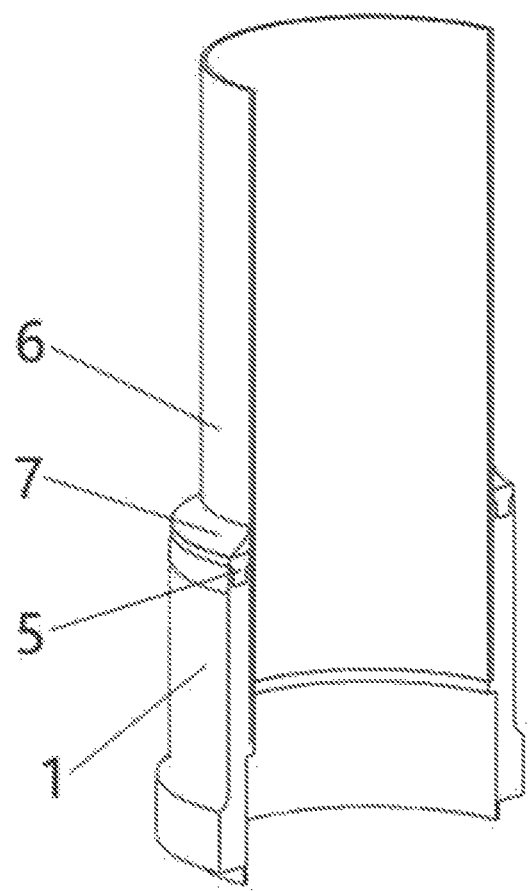
FIG. 10 is a sectional view of the stainless-steel port with the braze joint interface formed from the brazing filler material by vacuum melting and molding after being brazed to the copper pipe according to the present invention.

(4) As shown in FIGS. 9 and 10, the copper pipe 6 is inserted into the stainless-steel port after being provided with the braze joint interface, and a silver brazing rod 7 is used for brazing. Brazing between two copper interfaces is very easy and provide a considerably strong braze joint strength.

This embodiment has the following beneficial effects. The brazing between a brazed plate heat exchanger and a copper pipeline becomes very easy, and the joint is firm and reliable; a brazing time can be shortened so that production efficiency can be improved; material costs can be greatly reduced; and no flux is used during processing, thus causing no air pollution. Prior brazing between two different metals (stainless steel and copper) is changed to brazing between the same metals (copper and copper), and brazing between two copper interfaces is very easy as surface adhesion force of copper is considerably strong. Or the prior brazing is changed to brazing between a brazing filler material and copper, that is, with a brazing filler material melted and molded in the groove, a user can use a brazing rod of the same brazing filler material during brazing, and as long as the temperature of copper reaches a melting point of the brazing rod, the welding rod will be melted and joined to the surface of copper and fused with the brazing filler material in the annular groove, so that the braze joint is strong, reliable and easy to achieve.

What is claimed is:

1. A processing method for a stainless-steel heat-exchanger port with a braze joint interface formed from a brazing filler material by vacuum melting and molding; wherein the stainless-steel heat-exchanger port comprises:
a stainless-steel port, an annular groove provided at a to-be-brazed end face of the stainless-steel port, the brazing filler material correspondingly arranged in the annular groove, and a sealing cover for preventing overflowing of the brazing filler material when melted, wherein the brazing filler material is one of copper, brass, phosphorus copper, and silver brazing filler materials; wherein the processing method comprises:
providing the annular groove at the to-be-brazed end face of the stainless-steel port, and placing the brazing filler material in the annular groove; and placing the sealing cover over the brazing filler material and then heating the stainless-steel port together with a heat exchanger in a vacuum furnace to a temperature above a melting point of the brazing filler material, so that the brazing filler material melts and fills a molding space between the annular groove and the sealing cover and is joined to the stainless-steel port heated to the temperature, thus covering the to-be-brazed end face of the stainless-steel port with the brazing filler material.

\* \* \* \* \*